(12) United States Patent
You

(10) Patent No.: US 11,409,718 B2
(45) Date of Patent: Aug. 9, 2022

(54) METHOD FOR GENERATING AND TRANSMITTING MARC DATA IN REAL TIME WHEN USER APPLIES FOR WISH BOOK, AND SYSTEM THEREFOR

(71) Applicant: LIBERTREE Inc., Jeju-si (KR)

(72) Inventor: Jea Seoung You, Jeju-si (KR)

(73) Assignee: LIBERTREE Inc., Jeju-si (KR)

( * ) Notice: Subject to any disclaimer, the term of this patent is extended or adjusted under 35 U.S.C. 154(b) by 0 days.

(21) Appl. No.: 17/059,246

(22) PCT Filed: Oct. 7, 2019

(86) PCT No.: PCT/KR2019/013088
§ 371 (c)(1),
(2) Date: Nov. 26, 2020

(87) PCT Pub. No.: WO2020/085674
PCT Pub. Date: Apr. 30, 2020

(65) Prior Publication Data
US 2021/0209071 A1    Jul. 8, 2021

(30) Foreign Application Priority Data

Oct. 26, 2018  (KR) .................. 10-2018-0128908
Jun. 7, 2019   (KR) .................. 10-2019-0067498

(51) Int. Cl.
*G06F 16/21*      (2019.01)
*G06F 16/23*      (2019.01)
(Continued)

(52) U.S. Cl.
CPC ........ *G06F 16/211* (2019.01); *G06F 16/2379* (2019.01); *G06F 40/268* (2020.01); *G06Q 10/00* (2013.01); *G06Q 50/26* (2013.01)

(58) Field of Classification Search
CPC .. G06F 16/211; G06F 16/2379; G06F 40/268; G06Q 10/00; G06Q 50/26
(Continued)

(56) References Cited

U.S. PATENT DOCUMENTS 7,667,863 B1 * 2/2010 Eldred ................ H04N 1/3871
                                                358/1.13
10,321,167 B1 * 6/2019 Edell ................ H04N 21/23418
(Continued)

FOREIGN PATENT DOCUMENTS

JP        2004234076 A     8/2004
KR      20070091588 A     9/2007
(Continued)

OTHER PUBLICATIONS

International Search Report of PCT/KR2019/013088, dated Jan. 17, 2020, English translation.

*Primary Examiner* — Hosain T Alam
*Assistant Examiner* — Nicholas E Allen
(74) *Attorney, Agent, or Firm* — Studebaker & Brackett PC

(57) ABSTRACT

The present invention relates to a method and a system for generating MARC data in real time, and the method for generating MARC data in real time, according to one embodiment of the present invention, can comprise the steps of: (a) constructing a database by using MARC data and book information about a book having the MARC data generated therein; (b) receiving book information about a new book, and generating MARC data of the new book on the basis of the database and the received book information about the new book; and (c) providing the generated MARC data about the new book to a user.

11 Claims, 6 Drawing Sheets

(51) Int. Cl.
*G06F 40/268* (2020.01)
*G06Q 10/00* (2012.01)
*G06Q 50/26* (2012.01)

(58) Field of Classification Search
USPC .......................................................... 707/796
See application file for complete search history.

(56) References Cited

U.S. PATENT DOCUMENTS

| | | | | |
|---|---|---|---|---|
| 2006/0167933 | A1* | 7/2006 | Behbehani | G06F 16/958 |
| 2008/0051932 | A1* | 2/2008 | Jermyn | G06Q 30/02 |
| | | | | 700/215 |
| 2008/0320012 | A1* | 12/2008 | Loving | G06F 16/213 |
| 2010/0287210 | A1* | 11/2010 | Olof-Ors | G06F 16/9535 |
| | | | | 707/803 |
| 2012/0173578 | A1* | 7/2012 | Cheong | G06F 16/313 |
| | | | | 707/780 |
| 2013/0085973 | A1* | 4/2013 | Bingham | G06Q 50/01 |
| | | | | 706/45 |
| 2013/0227383 | A1* | 8/2013 | Kim | G06F 16/29 |
| | | | | 715/201 |
| 2014/0058888 | A1* | 2/2014 | Bingham | G06Q 30/06 |
| | | | | 705/26.8 |
| 2015/0199427 | A1* | 7/2015 | Miyabe | G06F 16/3344 |
| | | | | 707/739 |
| 2016/0140096 | A1* | 5/2016 | Ghosh | G06F 3/04842 |
| | | | | 715/230 |
| 2018/0253153 | A1* | 9/2018 | Primavesi | G06F 3/04886 |
| 2019/0332783 | A1* | 10/2019 | Bhardwaj | H04L 9/3239 |

FOREIGN PATENT DOCUMENTS

| | | |
|---|---|---|
| KR | 20090032546 A | 4/2009 |
| KR | 100991661 B1 | 11/2010 |
| KR | 20130108043 A | 10/2013 |
| KR | 20150008212 A | 1/2015 |
| KR | 102015089 B1 | 8/2019 |

* cited by examiner

METHOD FOR GENERATING AND TRANSMITTING MARC DATA IN REAL TIME WHEN USER APPLIES FOR WISH BOOK, AND SYSTEM THEREFOR

CROSS-REFERENCE TO RELATED APPLICATIONS

This application is the U.S. National Phase under 35 U.S.C. § 371 of International Application No. PCT/KR2019/013088 filed on Oct. 7, 2019, which in turn claims the benefit of Korean Application No. 10-2018-0128908 filed on Oct. 26, 2018 and No. 10-2019-0067498 filed on Jun. 7, 2019, the disclosures of which are incorporated by reference into the present application.

TECHNICAL FIELD

The present invention relates to a method and system for generating MARC data in real time when a library visitor requests a desired book and, more particularly, to a method of generating MARC data in real time when a user requests a desired book and transmitting the MARC data to a library or library server, that is, a user, wherein bibliographic data and category information of a new book whose MARC data needs to be generated and MARC data automatically generated through big data analysis using AI can be transmitted according to a format requested by a user, and a system capable of implementing the method.

BACKGROUND ART

MARC data means a series of meta data standard formats coded so that overall information related to a book can be identified by a computer as list data and accumulated and distributed. Today, in Korea, an integrated Korean machine readable cataloging (KORMARC) format for bibliography was regulated and used as a KS standard in 2005 using MARC 21, that is, an integrated format of the U.S.A. standard (USMARC) and the Canada standard (CAN/MARC) as a basic frame. The integrated KORMARC format for bibliography includes overall information related to a book, such as a book name, an author, the state of sales, the state of publication, the state of a form, a subject, a main category, etc. of a book.

Conventionally, as suggested in FIG. 1, a method of generating, by a book seller, MARC data and providing the MARC data to a book vendor or downloading and using, by other libraries, MARC data when National Library of Korea or Korea Education & Research Information Service directly generates and uploads the MARC data is used.

However, MARC data also includes an item into which a private opinion of a librarian who assigns Korean decimal classification (hereinafter "KDC") or Dewey decimal classification (hereinafter "DDC") has been incorporated, in addition to items containing objective information written in a book, such as a book name, an author, and a publication date. Accordingly, there are problems in that a librarian who has expert knowledge is essential in order to generate high-quality MARC data according to the conventional method and it is difficult to receive high-quality MARC data using a method provided by a book vendor.

Furthermore, although a librarian who works in a library and has expert knowledge performs a task of generating MARC data, there is still the possibility of an error. There is a possibility that different MARC data may be generated for each library. There are problems in that a lot of time is taken and inefficiency is present because a task of searching for and inputting a large amount of information must be repeated for each book.

In order to solve such problems, conventionally, various attempts were made to automatically generate MARC data (Korean Patent No. 10-0991661, etc.). However, such methods have a problem in that MARC data containing sufficient items which may be actually used in a library is not generated or accuracy is very low because the MARC data is generated using only bibliographic data which can be directly obtained from a book.

There is a need for a technology for automatically generating MARC data of a book, including KDC/DDC, the indication of whether a reference document and an index are present, a publishing place, whether an author is an individual or an organization, a subject term, a customized request symbol for each library, and a book registration number for each library which cannot be obtained based on only bibliographic data as described above, in particular, capable of transmitting or providing MARC data generated as described above according to a format requested by a user when a visitor requests a desired book. The present invention is related to the need.

DISCLOSURE

Technical Problem

The present invention has been made to solve the problems of the conventional technology, and an object of the present invention is to accurately generate even non-bibliographic data (e.g., KDC/DDC, the indication of whether a reference document and an index are present, a publishing place, whether an author is an individual or an organization, a subject term, a customized request symbol for each library, a book registration number for each library, etc.) which cannot be generated based on only basic bibliographic data, among MARC data, through big data analysis using AI, and transmitting the generated non-bibliographic data to libraries, that is, users, when a visitor requests a desired book.

Furthermore, an object of the present invention is to maximize generation efficiency of MARC data by generating accurate MARC data of a large number of books in real time through automated generation of the MARC data and transmitting the generated MARC data to a user when the user requests a desired book.

Technical objects of the present invention are not limited to the aforementioned technical objects, and other technical objects not described above may be evidently understood by those skilled in the art from the following description.

Technical Solution

A method of generating MARC data in real time according to one embodiment of the present invention for solving the aforementioned problems may include the steps of (a) constructing a database 100 using book information and MARC data of a book whose MARC data has been generated; (b) receiving book information of a new book and generating MARC data of the new book based on the received book information of the new book and the database 100; and (c) transmitting the generated MARC data of the new book to a user.

According to one embodiment, the book information may include bibliographic information, category information and table of contents information of the book.

According to one embodiment, the step (a) includes forming a mapping table onto which non-bibliographic information corresponding to the book information of the book whose MARC data has been generated has been mapped, and storing the mapping table in the database, wherein the non-bibliographic information may include at least any one of KDC/DDC, whether a reference document and an index are present, a publishing place, whether an author is an individual or an organization, and a subject term.

According to one embodiment, the step (b) may include the steps of (b-1) receiving the book information of the new book through an input unit; (b-2) extracting, by an extraction unit, non-bibliographic information mapped onto the book information received from the database; (b-3) calculating, by an analysis unit, similarity with a book stored in the database through analysis of a morpheme for the received bibliographic information; and (b-4) updating, by a generation unit, the extracted non-bibliographic information and generating the MARC data based on the similarity.

According to one embodiment, the similarity may be calculated as the product of the number of identical morphemes and a category weight.

According to one embodiment, the step (c) may include filtering an item requested by the user among the generated MARC data and providing the item.

Meanwhile, a system 10 for generating MARC data for performing the method of generating MARC data in real time according to one embodiment of the present invention includes a database in which book information and MARC data of a book whose MARC data has been generated is stored; a MARC generation unit receiving book information of a new book and generating MARC data; a communication unit transmitting and receiving the book information or the MARC data through communication with an external terminal; and a control unit. The database forms a mapping table onto which non-bibliographic information corresponding to the received book information has been mapped and stores the mapping table. The non-bibliographic information may include at least any one of KDC/DDC, whether a reference document and an index are present, a publishing place, whether an author is an individual or an organization, and a subject term.

According to one embodiment, the MARC generation unit may include an input unit receiving the book information of the new book; an extraction unit extracting non-bibliographic information corresponding to the book information of the new book; an analysis unit performing analysis of a morpheme on the bibliographic information of the new book; and a generation unit updating the non-bibliographic information and generating MARC data of the new book comprising the updated non-bibliographic information.

A method of generating MARC data in real time according to another embodiment of the present invention includes a construction step of constructing a database using book information and MARC data of a book whose MARC data has been generated; a generation step of receiving book information of a new book from a visitor and generating MARC data of the new book based on the received book information of the new book and the database; and a transmission step of transmitting the generated MARC data of the new book to a user when the user requests a desired book.

In this case, the book information may include at least any one of bibliographic information, category information and table of contents information of the book.

The constructing step includes forming a mapping table onto which non-bibliographic information corresponding to the book information of the book whose MARC data has been generated has been mapped, and storing the mapping table in the database. The non-bibliographic information may include at least any one of KDC/DDC, whether a reference document and an index are present, a publishing place, whether an author is an individual or an organization, and a subject term.

The generating step may include the steps of receiving the book information of the new book through an input unit; extracting non-bibliographic information mapped onto the book information, received from the database, through an extraction unit; calculating similarity with a book stored in the database through analysis of a morpheme for the received bibliographic information through an analysis unit; and updating the extracted non-bibliographic information and generating the MARC data based on the similarity through a generation unit.

It is preferred that the similarity is calculated as the product of the number of identical morphemes and a category weight.

The transmitting step includes filtering an item requested by the user among the generated MARC data and transmitting the item to the user. It is preferred that the MARC data further includes basic bibliographic information of the book.

Another embodiment of the present invention may be a system for generating and transmitting MARC data in real time, including a database in which book information and MARC data of a book whose MARC data has been generated is stored; a MARC generation unit receiving book information of a new book and generating MARC data; a communication unit transmitting and receiving the book information or the MARC data through communication with an external terminal; and a control unit.

It is preferred that the database forms a mapping table onto which non-bibliographic information corresponding to the received book information has been mapped and stores the mapping table, and the communication unit transmits, to a server of a user, MARC data which is generated in real time.

The MARC generation unit may include an input unit receiving the book information of the new book; an extraction unit extracting non-bibliographic information corresponding to the book information of the new book; an analysis unit performing analysis of a morpheme on the bibliographic information of the new book; and a generation unit updating the non-bibliographic information and generating MARC data of the new book comprising the updated non-bibliographic information.

Advantageous Effects

According to the present invention, high-quality MARC data, including accurate and sufficient items which can be used in an actual library system in addition to bibliographic data and category information of a new book, can be generated and provided through big data analysis using AI.

Specifically, non-bibliographic information, for example, information on KDC/DDC, the indication of whether a reference document and an index are present, a publishing place, whether an author is an individual or an organization, a subject term, a customized request symbol for each library, and a book registration number for each library which cannot be obtained based only basic bibliographic information of a book, among MARC data, can be automatically generated and provided to each library.

Furthermore, according to the present invention, manpower of a library can be efficiently managed because high-quality MARC data can be generated without a librarian who has expert knowledge.

Furthermore, accurate MARC data of a large number of books can be generated in real time and generation efficiency of MARC data can be maximized because the generation of the MARC data is automated through a system in which such big data is stored.

Furthermore, an integrated service which may be used by all libraries can be provided without the need to generate separate MARC data for each library because MARC data is generated, filtered, and provided according to a required format for each library. All of libraries and library visitors can efficiency provide and use a library service because the libraries use MARC data having the same system as described above.

In particular, when a library requests a desired book, machine-readable cataloging (MARC) information may be usefully used to collect accurate meta information. MARC information not included in the existing meta information can be very usefully used in a library because the MARC information can be transmitted.

Effects of the present invention are not limited to the aforementioned effects, and other technical effects not described above may be evidently understood by those skilled in the art from the following description.

DESCRIPTION OF REFERENCE NUMERALS

Figure 1:
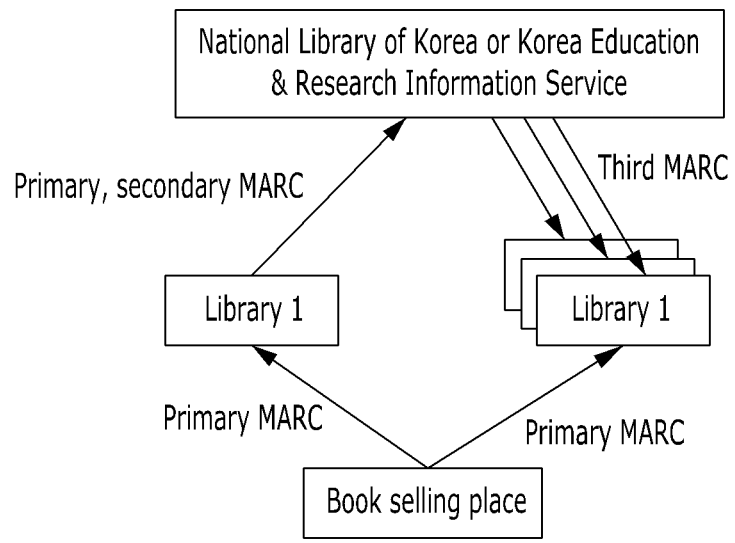
FIG. 1 is a diagram illustrating a method of providing MARC data according to a conventional technology.

10: MARC data generation system
100: database 200: MARC generation unit
210: input unit 220: extraction unit
230: analysis unit 240: generation unit
300: communication unit 400: control unit

MODE FOR INVENTION

Hereinafter, preferred embodiments of the present invention are described in detail with reference to the accompanying drawings. Advantages and characteristics of the present invention and a method of achieving advantages and characteristics will become more apparent from the embodiments described in detail in conjunction with the accompanying drawings. However, the present invention is not limited to the disclosed embodiments, but may be implemented in various different ways. The embodiments are provided to only complete the present invention and to allow those skilled in the art to fully understand the category of the present invention. The present invention is defined by the category of the claims. The same reference numerals will be used to refer to the same or similar elements throughout the specification.

All terms (including technological and scientific terms) used in the specification, unless defined otherwise, will be used as meanings which can be understood by a person having ordinary knowledge in the art to which the present invention pertains in common. Furthermore, terms used and defined in common dictionaries should not be construed as having ideal or excessively formal meanings unless specifically defined otherwise. Terms used in the specification are provided to describe the embodiments and are not intended to limit the present invention. In the specification, the singular form, unless specially described otherwise, may include the plural form.

In the drawings, in order to clarify a description of the present invention, parts not related to the description are omitted, and the same reference numbers are used to refer to the same or similar parts throughout the specification. Furthermore, when it is said that one element "includes" the other element, the word "include" will be understood to imply the inclusion of stated elements but not the exclusion of any other elements, unless explicitly described to the contrary. Furthermore, a "unit" described in this specification means one unit or block that performs a specific function.

Figure 2:
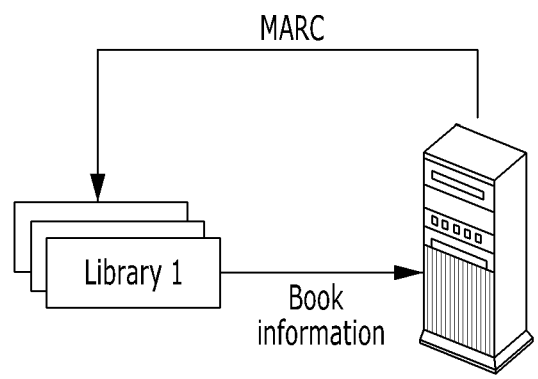
FIG. 2 is a diagram illustrating a method of generating and providing MARC data according to one embodiment of the present invention.

FIG. 1 is a diagram illustrating a method of providing MARC data according to a conventional technology. FIG. 2 is a diagram illustrating a method of generating and providing MARC data according to one embodiment of the present invention.

Referring to FIG. 1, conventionally, in general, a method of generating, by a book seller, MARC data and providing the MARC data to a book vendor or downloading and using, by other libraries, MARC data when National Library of Korea or Korea Education & Research Information Service directly generates and uploads the MARC data is used.

However, MARC data also includes an item into which a private opinion of a librarian who assigns Korean decimal classification (hereinafter "KDC") or Dewey decimal classification (hereinafter "DDC") has been incorporated, in addition to items containing objective information written in a book, such as a book name, an author, and a publication date. Accordingly, there are problems in that a librarian who has expert knowledge is essential in order to generate high-quality MARC data according to the conventional method and it is difficult to receive high-quality MARC data using a method provided by a book vendor.

Furthermore, although a librarian who works in a library and has expert knowledge performs a task of generating MARC data, there is still the possibility of an error. There is a possibility that different MARC data may be generated for each library. There are problems in that a lot of time is taken and inefficiency is present because a task of searching for and inputting a large amount of information must be repeated for each book.

Referring to FIG. 2, the present invention has been made to solve the aforementioned problems. When each library inputs book information to a system 10 for generating MARC data according to the present invention, MARC data can be automatically generated, and the generated MARC data can be directly transmitted and provided to a library.

Hereinafter, a system for generating MARC data in real time according to the present invention and a method of generating MARC data using the system are described in detail with reference to FIGS. 3 to 10.

Furthermore, in this specification, the generation of KDC/DDC information will be described as an example, but the present invention is not essentially limited thereto. If the same technical spirit as that of the present invention to be described later is used, various pieces of information which cannot be obtained based only basic bibliographic data of a book, such as the indication of whether a reference document and an index are present, a publishing place, whether an author is an individual or an organization, a subject term, a customized request symbol for each library, and a book registration symbol for each library, can be generated.

Figure 3:
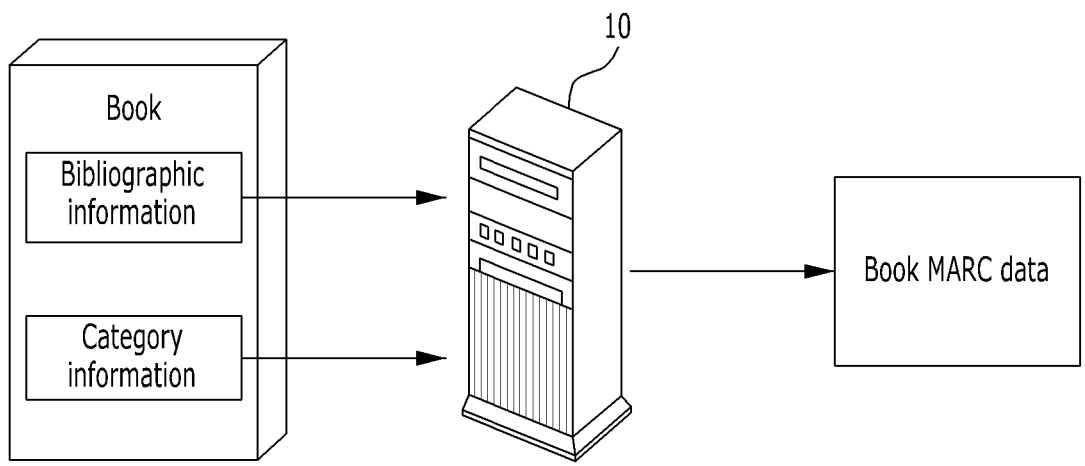
FIG. 3 is a diagram schematically illustrating that MARC data is generated using a system 10 for generating MARC data according to one embodiment of the present invention.

FIG. 3 is a diagram schematically illustrating that MARC data is generated using the system 10 for generating MARC data according to one embodiment of the present invention.

Referring to FIG. 3, the present invention may provide a method and system for generating MARC data in real time, wherein when a visitor requests a desired book from a library or library server (i.e., a user), book information including bibliographic information and category information of a new book is received, MARC data is generated using the book information, and the MARC data is provided to a user.

The MARC data means a series of meta data standard formats coded so that overall information related to a book can be identified by a computer as list data and accumulated and distributed. The present invention may estimate information on an item that constitutes MARC data based on limited information, such as received bibliographic information and category information, based on big data, may generate MARC data using the estimated information, and may provide the MARC data.

In this case, the bibliographic information may include a book name, an author, a publisher or ISBN information. The category information may include, for example, a generic type, philosophy, religion, social sciences, technological sciences, arts, languages, literature, and history, but is not essentially limited thereto. The category information may be variously classified depending on user setting, including upper and lower items thereof.

Furthermore, a new book does not essentially mean a book newly published within a given period, and may include all books whose MARC data needs to be newly generated.

Figure 4:
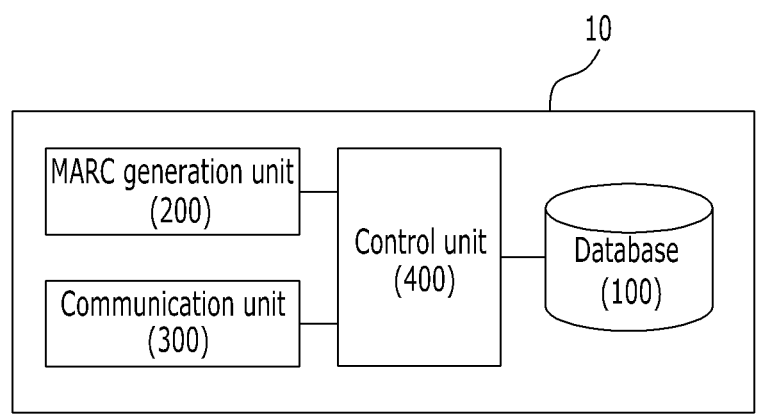
FIG. 4 is a diagram illustrating a configuration of the system 10 for generating MARC data in real time according to one embodiment of the present invention.

FIG. 4 is a diagram illustrating a configuration of the system 10 for generating MARC data in real time according to one embodiment of the present invention.

Referring to FIG. 4, the system 10 for generating MARC data in real time according to the present invention may include a database 100, a MARC generation unit 200, a communication unit 300 and a control unit 400.

The database 100 may store book information of books whose MARC data has already been generated, and MARC data corresponding to the corresponding book information.

The book information stored in the database 100 may include bibliographic information, category information and the table of contents information. The bibliographic information may include a book name, an author, a publisher or ISBN information, etc. The category information may include, for example, a generic type, philosophy, religion, social sciences, technological sciences, arts, languages, literature, and history, etc., but is not essentially limited thereto. The category information may be variously classified depending on user setting, including upper and lower items thereof.

According to one embodiment, the book information stored in the database 100 may further include reference information. The reference information may include the introduction, a table of contents, a summary, the language of the original, an original name and the original author of a book, but is not essentially limited thereto. The reference information may include various pieces of information related to a book depending on user setting.

Furthermore, the database 100 may further store information on morphemes that form bibliographic information or reference information of books. The information may be used when the analysis unit 230 calculates similarity between a new book and an already stored book through analysis of morphemes. This is described in detail when the analysis unit 230 is subsequently described.

The book information and the MARC data stored in the database 100 may be directly input to the database 100 through known input means (a keyboard, a mouth, a touch pad, a touch screen etc.), or book information and MARC data may be received from an external server included in a library, etc. and stored. Or as will be described later, MARC data of a new book generated in real time using a method of generating MARC data according to the present invention may be stored in the database 100 along with book information of a new book.

Meanwhile, the database 100 according to one embodiment of the present invention may store stored book information and non-bibliographic information of a book by forming a mapping table in which the stored book information corresponds to the non-bibliographic information. The non-bibliographic information may include, for example, KDC/DDC, the indication of whether a reference document and an index are present, a publishing place, whether an author is an individual or an organization and a subject term. In this case, each of KDC (Korean Decimal Classification, Korean decimal classification) and DDC (Dewey Decimal Classification, Dewey decimal classification) is a book classification system based on subjects, and means a classification system in which books are classified using a method of gradually classifying a book as a lower item toward a hundredth digit, a tenth digit, and 1 digit and a decimal point using numbers of 0 to 9. MARC data stored in the database 100 may include such KDC or DDC information of a book.

The database 100 according to the present invention may form and store a mapping table in which book information of books whose MARC data has already been generated and non-bibliographic information included in the MARC data of a corresponding book are made to correspond to each other.

The MARC generation unit 200 may receive book information of a new book, and may generate MARC data based on the received book information of the new book.

Figure 5:
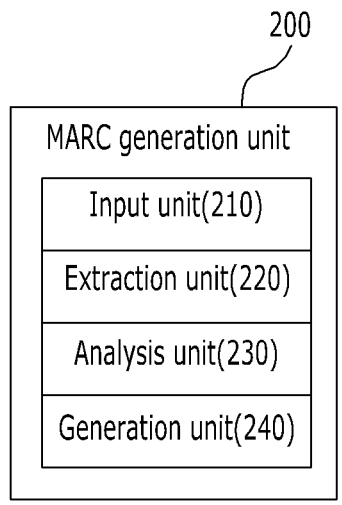
FIG. 5 is a diagram illustrating a configuration of a MARC generation unit 200 according to one embodiment of the present invention.

FIG. 5 is a diagram illustrating a configuration of the MARC generation unit 200 according to one embodiment of the present invention.

Referring to FIG. 5, the MARC generation unit 200 according to one embodiment of the present invention may include an input unit 210; an extraction unit 220; an analysis unit 230; and a generation unit 240.

The input unit 210 may receive book information of a new book whose MARC data is to be generated. In this case, the book information input to the input unit 210 may be directly input by known input means or may be received in a data form from an external server through the communication unit 300 to be described later. The book information input through the input unit 210 may include bibliographic information, category information or table of contents information of the new book.

The extraction unit 220 may extract non-bibliographic information mapped onto the received book information of the new book. As described above, the database 100 stores the mapping table indicative of a corresponding relationship between previously stored book information of books and non-bibliographic information corresponding to the book information. The extraction unit 220 may extract non-bibliographic information, mapped onto book information input through the input unit 210, based on the mapping table. For example, category information included in book information input through the input unit 210 is KDC, DDC mapped onto the category information input as atypical data based on the estimation of a user. The extraction unit 220 may extract the KDC, DDC mapped onto the received category information on the mapping table.

The analysis unit 230 performs analysis of a morpheme on received bibliographic information of a new book, and may calculate similarity by comparing the analyzed morpheme with morphemes that form bibliographic data of books already stored in the database 100. The analysis of a morpheme is one kind of a natural language processing scheme that analyzes the human's language through a machine apparatus, such as a computer, and means a method of analyzing a target word segment by decomposing the word segment in a morpheme unit, that is a minimum meaning unit.

Meanwhile, the similarity may be calculated through (the number of identical morphemes)×(category weight). Accordingly, a method of calculating similarity and an embodiment thereof are described in detail when a method of generating MARC data is subsequently described.

According to one embodiment, the analysis unit 230 according to the present invention may perform analysis of a morpheme including reference information, and may calculate similarity. The reference information may include the introduction, a table of contents, a summary, the language of the original, an original name and the original author of a book, but is not essentially limited thereto.

The generation unit 240 may update non-bibliographic information based on similarity calculated by the analysis unit 230, and may generate MARC data including the non-bibliographic information.

KDC or DDC extracted using the extraction unit 220 is KDC, DDC mapped onto category information input as atypical data based on the estimation of a user, and thus may cover a slightly wide range or may have low accuracy. The generation unit 240 can calculate more accurate KDC or DDC by updating KDC or DDC extracted by the extraction unit 220 based on similarity calculated by the analysis unit 230, and can generate MARC data including the KDC or DDC calculated with high accuracy as described above.

The communication unit 300 may transmit and receive book information and/or MARC data through communication with an external terminal.

The external terminal means an electronic device having communication means capable of communicating with the communication unit 300 according to the present invention, and may include a user terminal, a computer or server included in a library, etc.

That is, when a visitor requests a desired book, the system 10 for generating MARC data in real time according to the present invention may receive book information and/or MARC data from an external terminal through the communication unit 300 and store the received book information and/or MARC data in the database 100 or may generate MARC data of a new book, and may provide the MARC data of the new book to a user by transmitting the generated MARC data to an external terminal or a server.

The control unit 400 may control an overall operation of the system 10 for generating MARC data.

Hereinafter, a method of generating MARC data in real time using the system 10 for generating MARC data in real time according to the present invention is more specifically described.

Figure 6:
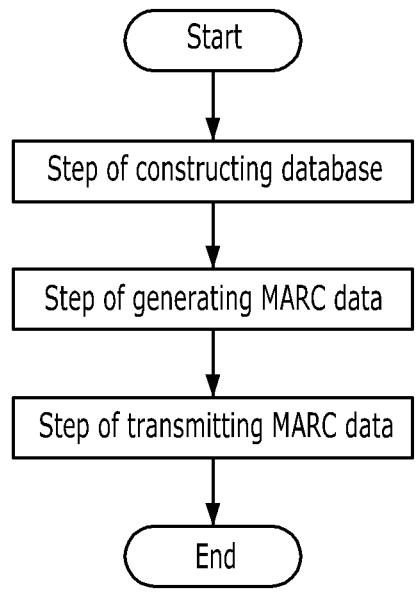
FIG. 6 is a flowchart illustrating a method of generating MARC data in real time according to one embodiment of the present invention.

FIG. 6 is a flowchart illustrating a method of generating MARC data in real time according to one embodiment of the present invention.

Referring to FIG. 6, the method of generating MARC data in real time according to one embodiment of the present invention may include the steps of, when a visitor requests a desired book, (a) constructing and storing, in the database 100, book information of a book whose MARC data has been generated and MARC data; (b) receiving book information of a new book and generating MARC data of the new book based on the received book information of the new book and the database 100; and (c) transmitting the generated MARC data of the new book to a user.

At step (a), the database 100 may be constructed by storing, in the database 100, book information and MARC data of books whose MARC data has already been generated. The book information and the MARC data may be directly input to the database 100 through known input means, or already stored book information and MARC data may be received from an external server included in a library, etc. and stored.

The book information may include bibliographic information, category information and table of contents information of a book. The bibliographic information may include a book name, an author, a publisher or ISBN information, etc. The category information may include, for example, a generic type, philosophy, religion, social sciences, technological sciences, arts, languages, literature, and history, but is not essentially limited thereto. The category information may be variously classified depending on user setting, including upper and lower items thereof.

Furthermore, the book information may further include reference information. The reference information may include the introduction, a table of contents, a summary, the language of the original, an original name and the original author of a book, but is not essentially limited thereto. The reference information may include various pieces of information related to a book depending on user setting.

According to one embodiment, the database 100 may form a mapping table in which stored book information and non-bibliographic information of a book are made to correspond to each other, and store the mapping table.

That is, at step (a), the database 100 may be constructed using information on books whose MARC data has already been generated, including non-bibliographic information. A mapping table in which book information of books stored in the database 100 has been mapped onto non-bibliographic information as described above may be formed and stored in the database 100.

At step (b), the MARC generation unit 200 may receive book information of a new book, and may generate MARC data of the new book based on the received book information of the new book and the database 100 constructed at step (a).

Figure 7:
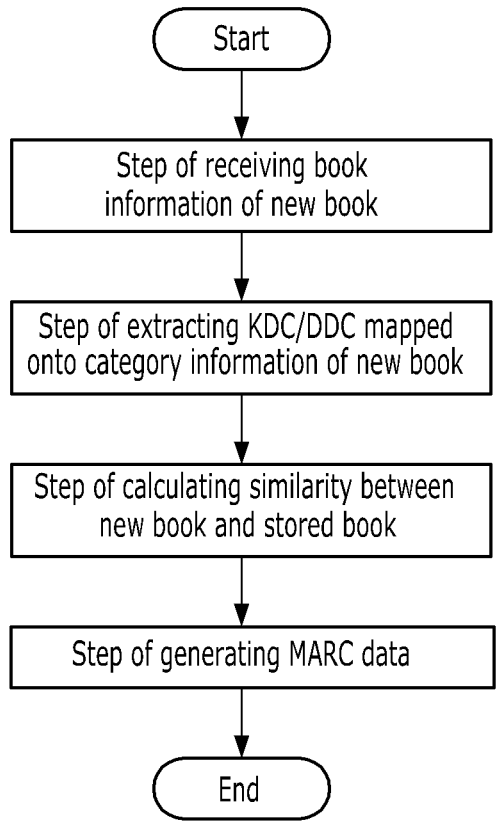
FIG. 7 is a flowchart illustrating a method of generating, by the MARC generation unit 200, MARC data of a new book according to one embodiment of the present invention.

FIG. 7 is a flowchart illustrating a method of generating, by the MARC generation unit 200, MARC data of a new book according to one embodiment of the present invention.

Referring to FIG. 7, the method of generating MARC data of a new book according to the present invention may include the steps of (b-1) receiving book information of a new book through the input unit 210; (b-2) extracting, by the extraction unit 220, non-bibliographic information mapped onto the book information received from the database 100; (b-3) calculating, by the analysis unit 230, similarity with a book stored in the database 100 through analysis of a morpheme on the received bibliographic information; and (b-4) updating, by the generation unit 240, the extracted non-bibliographic information based on the similarity and generating MARC data.

At step (b-1), book information including bibliographic information and category information of a new book is received through the input unit 210.

That is, at step (b-1), a user inputs bibliographic information of a new book whose MARC data is to be generated and category information estimated by the user. As described above, the bibliographic information and category information received from the user may be directly input to the input unit 210 through known input means or may be received from an external server through the communication unit 300 and input to the input unit 210.

In this case, the bibliographic information included in the book information input by the user includes objective information written in a book, such as a book name, an author, a publisher or an ISBN. The category information may be a category estimated based on subjective analysis of a user.

The book information input at step (b-1) may further include reference information in addition to bibliographic information, category information and table of contents information. The reference information may include the introduction, a table of contents, a summary, the language of the original, an original name and the original author of a book, but is not essentially limited thereto.

At step (b-2), non-bibliographic information mapped onto the book information of the new book received at step (b-1) is extracted through the extraction unit 220.

The database 100 according to the present invention stores a mapping table indicative of a corresponding relationship between book information including category information and non-bibliographic information corresponding to the book information. At step (b-2), non-bibliographic information mapped onto the book information input by the user at step (b-1) may be extracted based on the mapping table.

At step (b-3), the analysis unit 230 calculates similarity with a book stored in the database 100 through analysis of a morpheme for the received bibliographic information.

The analysis of a morpheme is one kind of a natural language processing scheme that analyzes the human's language through a machine apparatus, such as a computer, and means a method of analyzing a target word segment by decomposing the word segment in a morpheme unit, that is a minimum meaning unit.

The analysis unit 230 may perform the analysis of a morpheme on the bibliographic information of the new book received at step (b-1), and may calculate the similarity by comparing the morpheme with morphemes that form bibliographic data of books already stored in the database 100.

The similarity may be calculated through (the number of identical morphemes)×(category weight). This may be represented as an equation below.

$$S_i = N_i \times w_i$$

($S_i$: similarity, $N_i$: the number of identical morphemes, and $w_i$: a category weight)

The number of identical morphemes ($N_i$) formulates that there is a good possibility that a new book will be similar according to higher frequency that the same morpheme appears.

The category weight ($w_i$) formulates that there is a good possibility that a book having a category similar to category information input by a user will be similar with a new book.

According to one embodiment, the category weight may be set to have high weight for a book whose KDC, DDC extracted at step (b-2) is sequentially identical in a hundredth digit, a tenth digit, and 1 digit.

KDC and DDC is a classification system in which books are classified using a method of gradually classifying a book as a lower item toward a hundredth digit, a tenth digit, and 1 digit and a decimal point using numbers of 0 to 9. There is a good possibility that a book may have a similar category as a hundredth digit, a tenth digit, and 1 digit are sequentially identical.

That is, the highest category weight may be set for a new book having the same KDC, DDC calculated at step (b-2), hundredth digit, tenth digit, and 1 digit. The category weight may be set in order of a book whose hundredth digit and tenth digit are identical, a book whose hundredth digit is identical, and a book whose hundredth digit is not identical.

Although not represented in the equation, in calculating the similarity according to one embodiment, weight may be set to be differently assigned depending on a morpheme.

A degree of association with a category included in each book may be different for each morpheme extracted from bibliographic information of a book by the analysis unit 230. Weight may be set to be differently set for each morpheme based on the degree of association.

In this case, a high weight may be set to be assigned for each morpheme having high frequency of appearance in the same category.

According to one embodiment, the analysis unit 230 according to the present invention may perform analysis of a morpheme on reference information in addition to bibliographic information of a new book. The reference information may include the introduction, a table of contents, a summary, the language of the original, an original name and the original author of a book.

At step (b-4), the generation unit 240 updates the extracted non-bibliographic information based on the similarity calculated at step (b-3), and updates MARC data.

For example, as described above, the KDC or DDC extracted at step (b-2) is KDC, DDC mapped onto category information input as atypical data based on the estimation of a user, and thus may cover a slightly wide range or may have low accuracy. At step (b-4), more accurate KDC, DDC can be calculated by updating the extracted KDC or DDC based on the received bibliographic information of the book. MARC data including KDC or DDC calculated with high accuracy as described above may be generated.

Meanwhile, the MARC data of the new book generated at step (b-4) may be automatically updated and stored in the database 100 according to the present invention along with the book information of the new book.

At step (c), the MARC data of the new book generated at step (b) may be provided to the user by transmitting the MARC data to a terminal owned by the user or a server (e.g., a library server) operated by the user.

According to one embodiment, at step (c), an item requested by the user, among the generated MARC data, may be filtered and provided.

As described above, MARC data generated by the method of generating MARC data according to the present invention may be data obtained by coding and storing overall information on a book, including a book name, an author, the state of sales, the state of publication, the state of a form, a subject, a main category, etc. Each user or library may selectively select and receive only an item to be used among the data.

Figure 8:
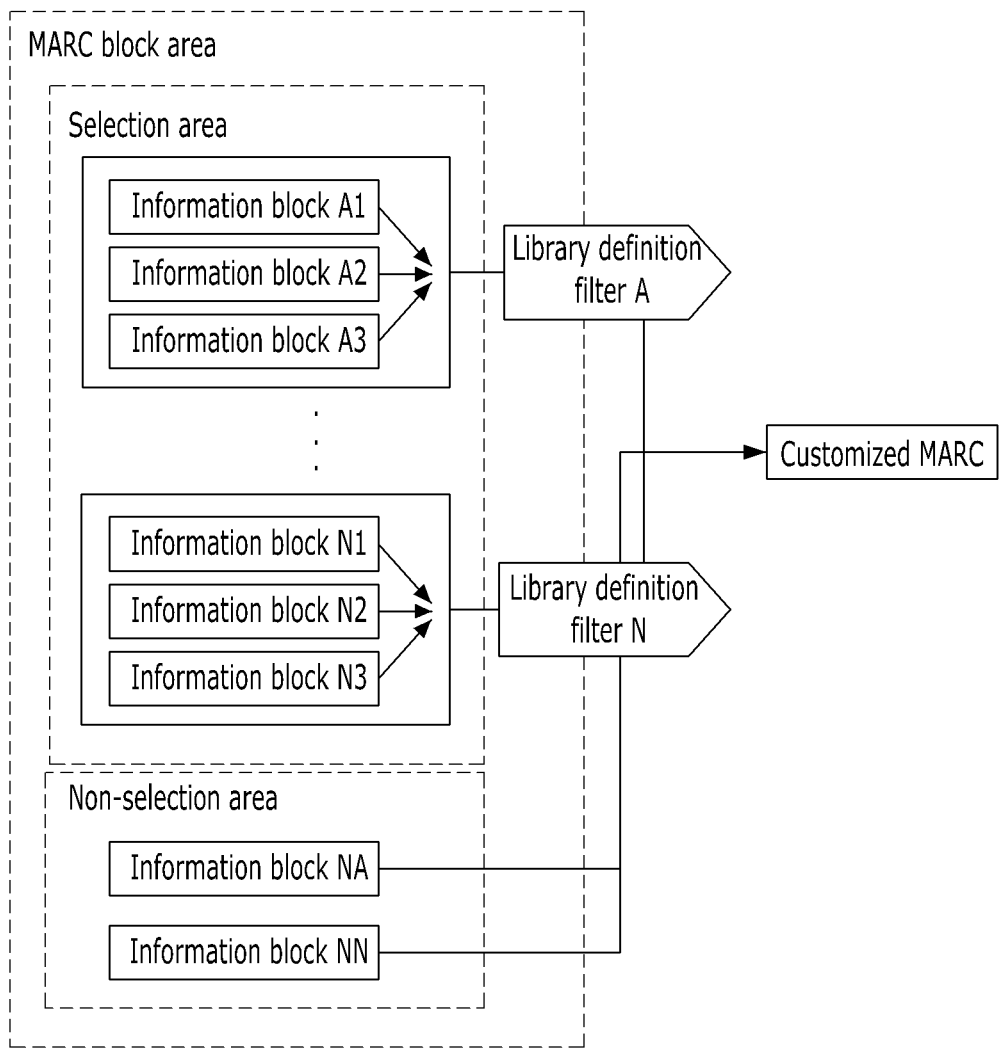
FIG. 8 is a diagram illustrating that MARC data is filtered according to one embodiment.

FIG. 8 is a diagram illustrating that MARC data is filtered according to one embodiment.

Referring to FIG. 8, a library A or N may filter and receive only a desired item, among MARC data generated by the system for generating MARC data in real time, by selecting only items corresponding to a selection area and excluding items corresponding to a non-selection area through a library definition filter A to a library definition filter N defined for each library.

As described above, in this specification, the generation of KDC/DDC information has been described as an example, but the technical spirit of the present invention is not essentially limited thereto. Various pieces of information which cannot be generated based on only basic bibliographic data of a book, such as the indication of whether a reference document and an index are present, a publishing place, whether an author is an individual or an organization, a subject term, a customized request symbol for each library, and a book registration symbol for each library, including KDC/DDC information, can be generated.

Figure 9:
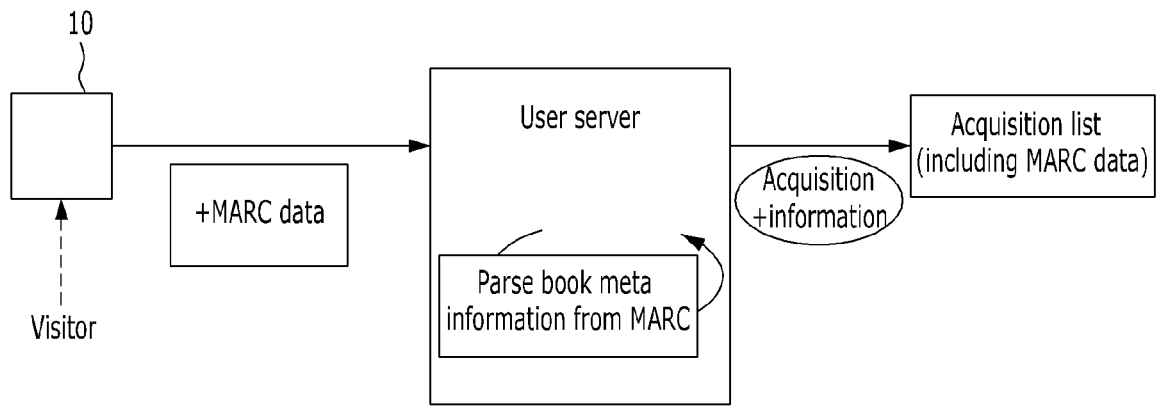
FIGS. 9 and 10 are diagrams illustrating a process of transmitting generated MARC data from the system 10 for generating MARC data in real time to a user server according to the present invention.
Figure 10:
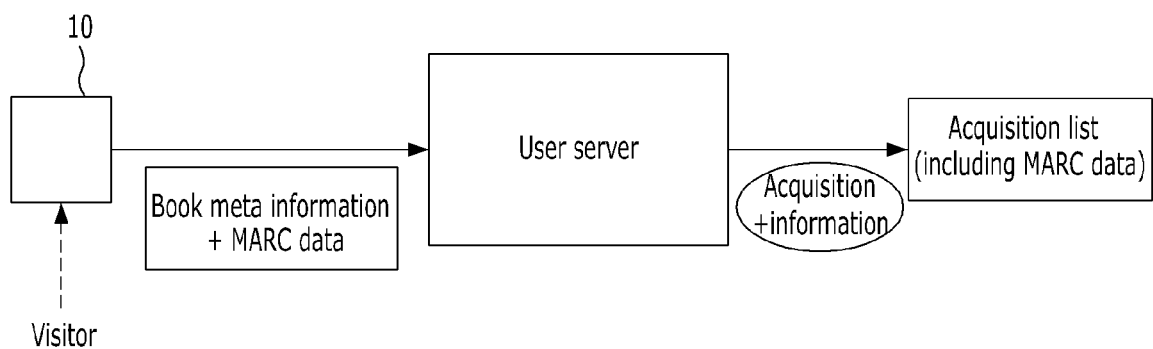

FIGS. 9 and 10 are diagrams illustrating processes of, when a visitor (in this case, the visitor means a person who requests a book to be purchased) requests a desired book, receiving, by the system 10 for generating MARC data in real time according to the present invention, received or transmitted book information of a new book, generating MARC data of the new book in real time, and transmitting the generated MARC data to a user server (e.g., a library server or a reception server).

As may be seen from FIG. 9, MARC data transmitted from the system 10 for generating MARC data in real time according to the present invention to a user includes book meta information. Accordingly, although only the MARC data is transmitted, a user server can extract the book meta information by parsing the MARC data. Furthermore, the user server may produce a acquisition list including the MARC data based on the extracted book meta information. In this case, the MARC data is data at timing at which the MARC data is transmitted from the system 10 for generating MARC data in real time according to the present invention to the user server.

Accordingly, in the method of generating and transmitting MARC data in real time according to the present invention, only MARC data, that is, a standard data format, is used when the MARC data is transmitted from the system 10 for generating MARC data in real time to the user server. Accordingly, there is an advantage in that upon first communication, a user or a user server can receive MARC data from various supply sources (using the present invention) without the need to transmit a separate standard to a destination.

FIG. 10 shows another modification example related to a process of generating MARC data of a new book in real time and transmitting the generated MARC data to a user server (e.g., a library server or a reception server) according to the present invention.

Unlike in the process of FIG. 8, the modification example is a method in which when the system 10 for generating MARC data in real time according to the present invention transmits MARC data to a user server, the system transmits meta information of a book, along with the MARC data generated in real time, as one value at a time.

As described above, the user server receives meta information of a book along with MARC data generated in real time as one value at a time. Accordingly, the user server can produce a acquisition list using the book meta information more rapidly and accurately, and can include the MARC data received together. If MARC data is transmitted in real time using such a method, there is an advantage in that the present invention can be applied with the least modification of the existing system.

The aforementioned embodiments of the present invention have been disclosed for illustrative purposes, but the present invention is not restricted by the embodiments. Furthermore, those skilled in the art to which the present invention pertains may modify and change the present invention in various ways within the spirit and scope of the present invention, and such modifications and changes should be construed as falling within the scope of rights of the present invention.

INDUSTRIAL APPLICABILITY

The present invention relates to a method and system for generating MARC data in real time when a library visitor requests a desired book. Bibliographic data and category information of a new book necessary to generate MARC data and MARC data can be automatically generate through big data analysis using AI, and can be transmitted according to a format requested by a user. When a desired book is requested, MARC data can be generated in real time and transmitted to a library or library server, that is, a user. Furthermore, in addition to bibliographic data and category information of a new book, high-quality MARC data including accurate and sufficient items, which may be used within an actual library system, can be generated and provided through big data analysis using AI. Accordingly, the present invention has the industrial applicability.

The invention claimed is:

1. A method of generating Machine-Readable Cataloging (MARC) data in real time, the method performed by a system including hardware devices of a non-transitory memory, a MARC generation unit, a communication unit, and a control unit, the method comprising:
  (a) constructing, in the non-transitory memory, by the control unit, a database using book information and MARC data of a book whose MARC data has been generated;
  (b) receiving, by the communication unit, from an external server of a library, book information of a new book, and automatically generating, by the MARC generation unit, MARC data of the new book based on the received book information of the new book and based on data stored in the database; and
  (c) automatically providing, by the communication unit, the generated MARC data of the new book to a user terminal,
  wherein the step (b) comprises steps of:

(b-1) receiving the book information including bibliographic information, of the new book through an input unit;

(b-2) extracting, by an extraction unit, non-bibliographic information mapped onto the received book information, from the database;

(b-3) calculating, by an analysis unit, similarity with a book stored in the database through analysis of a morpheme for the received bibliographic information, the analysis of a morpheme is a natural language processing scheme that analyzes human's language through a computer system by analyzing a target word segment by decomposing the word segment in a morpheme unit; and (b-4) automatically updating, by the MARC generation unit, the extracted non-bibliographic information based on the similarity and generating the MARC data, and the similarity is calculated as a product of a number of identical morphemes and a category weight.

2. The method of claim 1, wherein the book information comprises at least any one of bibliographic information, category information and table of contents information of the book.

3. The method of claim 2, wherein:

the step (a) comprises forming a mapping table onto which the non-bibliographic information corresponding to the book information of the book whose MARC data has been generated has been mapped and storing the mapping table in the database, and the non-bibliographic information comprises at least any one of KDC/DDC, whether a reference document and an index are present, a publishing place, whether an author is an individual or an organization, a subject term, a customized request symbol for each library, and a book registration number for said each library.

4. The method of claim 1, wherein:

the step (c) comprises filtering an item requested by the user terminal, among the generated MARC data and providing the filtered item to the user terminal, and the MARC data further comprises basic bibliographic information of the book.

5. A system for generating Machine-Readable Cataloging (MARC) data in real time, comprising:

hardware devices of a non-transitory memory, a MARC generation unit, a communication unit, and a control unit, wherein:

the non-transitory memory is configured to construct a database that stores book information and MARC data of a book whose MARC data has been generated;

the communication unit is configured to receive, from an external server of a library, book information including bibliographic information, of a new book;

the MARC generation unit is configured to automatically generate MARC data of the new book based on the received book information of the new book and based on data stored in the database;

the communication unit is configured to automatically transmit the generated MARC data of the new book to a user terminal;

the database is further configured to form a mapping table onto which non-bibliographic information corresponding to the received book information has been mapped and store the mapping table;

the non-bibliographic information comprises at least any one of KDC/DDC, whether a reference document and an index are present, a publishing place, whether an author is an individual or an organization, and a subject term;

the MARC generation unit comprises an input unit configured to receive the book information of the new book, an extraction unit configured to extract non-bibliographic information corresponding to the book information of the new book, an analysis unit configured to perform analysis of a morpheme on the bibliographic information of the new book, and a generation unit configured to automatically update the non-bibliographic information and generate MARC data of the new book comprising the updated non-bibliographic;

the analysis of a morpheme is a natural language processing scheme that analyzes human's language through a computer system by analyzing a target word segment by decomposing the word segment in a morpheme unit;

the analysis unit is configured to calculate similarity with a book stored in the database through analysis of a morpheme for the received bibliographic information; and the similarity is calculated as a product of a number of identical morphemes and a category weight.

6. A method of generating Machine-Readable Cataloging (MARC) data in real time, the method performed by a system including hardware devices of a non-transitory memory, a MARC generation unit, a communication unit, and a control unit, the method comprising:

(a) constructing, in the non-transitory memory, by the control unit, a database using book information and MARC data of a book whose MARC data has been generated, the constructing step further comprising forming a mapping table onto which non-bibliographic information corresponding to the book information of the book whose MARC data has been mapped, and storing the mapping table in the database;

(b) receiving, by the communication unit, from an external server of a library, book information including bibliographic information, of a new book, and automatically performing:

extracting, by the MARC generation unit, non-bibliographic information mapped onto the book information received from the database;

calculating similarity with a book stored in the database through analysis of a morpheme for the received bibliographic information, the analysis of a morpheme is a natural language processing scheme that analyzes human's language through a computer system by analyzing a target word segment by decomposing the word segment in a morpheme unit; and generating, by the MARC generation unit, MARC data of the new book based on the received book information of the new book and data stored in the database; and (c) automatically transmitting, by the communication unit, the generated MARC data of the new book to a user terminal when the user terminal requests a desired book, wherein the similarity is calculated as a product of a number of identical morphemes and a category weight, and wherein the weight is set to be differently assigned depending on a morpheme.

7. The method of claim 6, wherein the book information comprises at least any one of bibliographic information, category information, and reference information of the book, wherein the bibliographic information comprises at least any one of book name, an author, a publisher, and an ISBN information, and wherein the reference information comprises at least any one of introduction, a table of contents, a summary, a language of original, an original name, and an original author of the book.

8. The method of claim 7, wherein the category information is classified based on user setting.

9. The method of claim 7, wherein the category information comprises at least any one of philosophy, religion, social sciences, technological sciences, arts, languages, literature, and history.

10. The method of claim 6, wherein a high weight is set to assigned for each morpheme having high frequency of appearance in same category.

11. The method of claim 6, wherein the generated MARC data includes book meta information, and the step (c) further comprises: extracting the book meta information by parsing the MARC data, and producing an acquisition list for the user terminal based on the extracted book meta information.

* * * * *